United States Patent [19]

Schwan

[11] Patent Number: 5,229,159
[45] Date of Patent: Jul. 20, 1993

[54] PREPARATION OF EVAPORATED MILK

[75] Inventor: Michael Schwan, Biglen, Switzerland

[73] Assignee: Nestec S.A., Vevey, Switzerland

[21] Appl. No.: 869,311

[22] Filed: Apr. 15, 1992

[30] Foreign Application Priority Data

Jun. 12, 1991 [EP]  European Pat. Off. ........ 91109634.5

[51] Int. Cl.$^5$ ................................................ A23C 1/12
[52] U.S. Cl. ................................... 426/587; 426/491; 426/519; 426/522
[58] Field of Search ................ 426/491, 519, 587, 522

[56] References Cited

U.S. PATENT DOCUMENTS

| 1,432,686 | 10/1922 | Grindrod | 426/491 |
| 2,822,277 | 2/1958 | Ellerston et al. | 426/587 |
| 2,886,450 | 5/1959 | Stewart et al. | 426/587 |
| 3,119,702 | 1/1964 | Leviton et al. | 426/587 |

OTHER PUBLICATIONS

Abstracts from International Dairy Congress "11.2 Condensed Milk," pp. 42-55 (1982).

Primary Examiner—Jeanette Hunter
Assistant Examiner—Helen Pratt
Attorney, Agent, or Firm—Vogt & O'Donnell

[57] ABSTRACT

Evaporated milk is prepared by separating a standardized milk into a first flux and a second flux, homogenizing the first flux, mixing the homogenized first flux with the unhomogenized second flux, heat-treating the mixture, evaporatively concentrating the heat-treated mixture, homogenizing the concentrate and then sterilizing the homogenized concentrate.

14 Claims, No Drawings

PREPARATION OF EVAPORATED MILK

BACKGROUND OF THE INVENTION

This invention relates to production of an evaporated milk product containing fats.

Evaporated milk or cream is prepared from whole milk or cream by partial removal of the water which it contains. The effect of concentration is to bring the fat globules together which can produce a raising of the fats during storage. Finally, since evaporated milk is intended for prolonged storage, it has to be sterilized.

When sterilization is carried out by a thermal preserving treatment after packing, for example in cans, there is an increased risk of destabilization of the liquid phase by heat due to the disturbance of the caseinate/calcium phosphate system after concentration. In storage, the milk thus treated can thicken and then gel. A standard method of overcoming this particular disadvantage is to add stabilizing salts such as, for example, disodium phosphate or trisodium citrate. However, these additives are being increasingly opposed by food legislation.

An alternative is the aseptic packing of evaporated milk which has been sterilized in-line, for example by the ultra-high temperature or high temperature/short time method. U.S. Pat. No. 2,886,450, for example, describes a process for the production of evaporated milk sterilized by the high temperature/short time method, in which the stability of the product in storage is improved by subjecting it to heat treatment and homogenization. However, this method does not prevent gel formation in the event of prolonged storage.

SUMMARY OF THE INVENTION

The problem addressed by the present invention was to provide a process for the production of a storable evaporated milk product resistant to the acidity of coffee in which the stabilizing salts are reduced or even eliminated.

Accordingly, the present invention relates to a process for the production of a storable evaporated milk product containing fats, in which a milk standardized to have a ratio by weight of fats to non-fat dry matter of 0.2:1 to 1.2:1 is heat-treated and then concentrated to a dry matter content of 20 to 40% by weight, after which the concentrate is sterilized before or after homogenization.

According to the invention, the problem stated above is surprisingly solved by the fact that the milk product is separated into a first flux and a second flux, the first flux is homogenized, the first homogenized flux is mixed with the second non-homogenized flux, the mixture is heat-treated before concentration and the concentrate is homogenized before sterilization.

The first flux is separated from the milk containing fats so that the first flux is in an amount of from 25% to 75% by weight of an amount of the first and second fluxes, and may be approximately 50% or from 5% to 99% by weight of an amount of the first and second fluxes.

DETAILED DESCRIPTION OF THE INVENTION

To carry out the process, whole milk is standardized, i.e., the respective quantities by way of fats and non-fat solids are adjusted to the desired values by addition as required of, for example, skimmed milk, cream or butter oil (anhydrous lactic fat).

In one embodiment of the process, the standardized milk product is preheated to 50° to 100° C. and is then separated into two fluxes simply by adjusting the entry rate to a value above the exit rate from the homogenizer. This gives a first main flux, which is homogenized, and a second subsidiary flux which bypasses the homogenizer. Homogenization of the main flux preferably takes place under intensive conditions.

The object of homogenization is to increase the surface area of the fat globules and better bind the proteins and thus to compensate for the relative deficiency of membranel lipids. "Intensive homogenization", is intended to mean that the product is treated by one or more passes through a single-stage or multiple-stage homogenizer under pressures ranging from 150 to 500 bar and preferably, by one or two passes in two stages under a pressure of 200 to 300 bar for the first stage and then under a pressure of approximately 50 bar for the second stage. It is possible in this way to obtain a reduction in, and uniform distribution of, the size of the fat globules in the flux of homogenized product.

Unexpectedly, homogenization of only part of the product to be treated before concentration is sufficient to produce a substantial increase in the stability of the concentrated product. The necessary homogenization pressure of 150 to 350 bar is of course also involved in the desired increase in stability. The higher the percentage by weight of homogenized product relative to the treated product as a whole and the higher the homogenization pressure, the more resistant the concentrate will be to coagulation during the sterilization phase and hence, the less need there will be to add a stabilizing salt, of which the function is precisely to avoid such coagulation.

After homogenization, the main flux is preferably subjected to a holding phase, for example of up to 5 minutes at the homogenization temperature.

The two fluxes are then mixed and preheated.

They are then heat-treated to stabilize the bonds between the proteins so that they remain intact after concentration. This heat treatment may be carried out by direct or indirect heating in any standard apparatus which enables the liquid to be kept at 80° to 150° C. for 1 to 1,200 s. The upper temperature limit naturally corresponds to the lower time limit. It is thus possible, for example, to combine a plate-type heat exchanger with a holding tube and a controlled back-pressure valve, two plate-type heat exchangers connected by a holding tube or even a plate-type heat exchanger associated with a controlled back-pressure valve and a thermostatically controlled holding tank.

After this heat treatment, the liquid is concentrated by evaporation with expansion to a dry matter content of 20 to 40% and preferably 24 to 35% by weight in a single-effect or preferably multiple-effect falling-film evaporator.

After concentration, the liquid is homogenized, preferably by a single pass through a two-stage homogenizer under a pressure of 75 to 300 bar for the first stage and approximately 30 bar for the second stage. The object of this homogenization is to break up the clusters of fat globules formed during the concentration step and to reduce the size of these fat globules.

After homogenization, the homogenized concentrate may be directly heat-treated or temporarily stored. In the first case, the dry matter content of the concentrate is adjusted where necessary to the value desired for the end product, for example 24 to 33% by weight, by addition of water. In the second case, the concentrate is cooled to 1°-10° C. and preferably to 4°-8° C. and, after adjustment of its dry matter content as described above, is left standing for 1 to 24 h. The concentrate may also be directly subjected to the second heat treatment without temporary storage.

The second heat treatment may be carried out in the same way as the first heat treatment, i.e., by direct or indirect heating at 50° to 150° C., for example by injection of steam and, after a holding time of 1 to 600 s, by expansion in a vessel which results in cooling to 50° to 100° C. During this second heat treatment, the bound proteins are stabilized by partial denaturing. The bonds thus strengthened are strong enough to ensure that the proteins are no longer able to coagulate during subsequent sterilization.

Homogenization is then carried out under similar conditions to the above-described homogenization and with the same objective, namely to break up the clusters of fat globules formed. The homogenizate is then cooled to 0°-20° C. and preferably to 4°-8° C. and its dry matter content is optionally adjusted to the value desired for the end product by addition of water.

Finally, the milk product is sterilized, if necessary after temporary storage. In a first embodiment of this sterilization, the milk product is packed in containers, for example in metal cans, glass bottles or heat-resistant plastic bottles which are hermetically sealed, after which the containers are treated in a sterilizer for 30 s to 60 mins. at 95° to 135° C., the upper temperature limit corresponding to the lower time limit, either in a single stage or by progressive increases in temperature.

In one variant of sterilization, in-line sterilization is followed by aseptic packing. To this end, the concentrate is preheated to 50°-90° C. and subjected to in-line sterilization by indirect or direct heating, for example for 2 s to 1 h at 105° to 150° C., the upper temperature limit corresponding to the lower time limit, and preferably by high-temperature/short time or ultra-high temperature treatment. The milk product is then cooled to 50°-90° C., if necessary by expansion, and homogenized in one or more passes and in one or two stages at 50 to 300 bar, preferably in one pass first under a pressure of 200 to 250 bar in the first stage and then under a pressure of approx. 50 bar in the second stage. Finally, the milk product is cooled to 4°-30° C. and preferably to around 20° C. and is then packed, for example in metal cans or cartons. The operations following sterilization naturally take place under aseptic conditions.

In one non-preferred variant of the process, the homogenized flux may be added to the subsidiary flux after concentration and homogenization thereof and the mixture subsequently sterilized. In a preferred form of this variant, the homogenized flux may be heat-treated before mixing with the flux which has not been homogenized before concentration.

The milk product prepared in accordance with the invention without stabilizing salts, or with a reduced content of these salts, is stable in storage in the same way as conventional products containing, for example, approximately 0.14% by weight stabilizing salts. In addition, it can be sterilized with very little, if any, of these particular additives which, hitherto, have been considered to be indispensable for avoiding gel formation and/or coagulation during sterilization. In addition, it is sufficiently resistant to the acidity of a hot water-containing coffee extract and does not to produce any flocculation when added to the extract stabilizing salt in an amount of from 0.02 to 0.2% may be added before concentration.

Another very interesting effect of the process according to the invention, in its preferred embodiment, is that it provides for a substantial increase in the homogenization pressure during homogenization of the concentrate which would normally result in coagulation during subsequent sterilization. In addition, the fact that only part of the starting material is treated by homogenization, without affecting the storage stability of the product as a whole, affords a significant economic advantage.

EXAMPLES

The invention is illustrated by the following Examples in which parts and percentages are by weight unless otherwise indicated.

EXAMPLES 1 to 9

A whole milk is standardized by addition of cream to give a starting material containing 8% fats and 17% non-fat milk solids. This starting material is preheated for 30 s to 80° C. in a plate-type heat exchanger and is then passed through a two-stage homogenizer in which the throughput is controlled so that a flux representing the percentage indicated below of the inflowing flux is treated, the rest being diverted, i.e., not undergoing homogenization. The pressures indicated below prevail in the first stage and in the second stage, if any. The homogenized and non-homogenized fluxes are then mixed and the mixture obtained is heated for 72 s to 120° C. in a plate-type heat exchanger.

In a variant of Example 1, preheating to 120° C. may be followed by cooling to 96° C. for 8 minutes in a tank (Example 4). The mixture is then directed to a falling-film evaporator in which it is concentrated to 25% dry matter by expansion "in vacuo". The concentrate is preheated to 70° C. and is then treated in a two-stage homogenizer under the pressures shown below. The homogenized concentrate is cooled to 5° C. and poured into glass bottles which are hermetically sealed and then sterilized for 15 minutes at 117° C. in a continuous rotary sterilizer. In a variant of Example 1, the bottles may be treated for 8 mins. at 120° C. (Example 5).

For comparison (Comparison Examples 1, 2, 3 and 4), the same treatment is carried out with homogenization of all the starting material.

The results obtained by addition of 0.14% disodium hydrogen phosphate, but without homogenization of the starting material (Comparison Example 5), are also compared.

The stability of an evaporated milk in storage is evaluated by examination of the viscosity (N.s.) of the sterilized product, which serves as criterion because thickening is, so to speak, the precursor of coagulation. The higher the viscosity after sterilization, the less stable the product was before sterilization, and even lower is its stability in storage. The end product is considered to have coagulated when the viscosity reaches the upper limit of approximately 23 to 25 N.s.

The results of viscosity measurement and the conditions of the process are set out in Table I below.

TABLE I

| Example | Homogenized flux % | Homogenization pressure of the starting material in one or two stages (bar) | Homogenization of the concentrate in two stages (bar) | Viscosity (N.s.) |
|---|---|---|---|---|
| 1 | 75 | 250 + 50 | 170 + 30 | 16 |
| 2 | 50 | 250 + 50 | 170 + 30 | 17 |
| 3 | 25 | 250 + 50 | 170 + 30 | 20 |
| 4 | 75 | 250 + 50 | 170 + 30 | 16 |
| 5 | 75 | 250 + 50 | 170 + 30 | 16 |
| Comparison 1 | 100 | 250 + 50 | 170 + 30 | 15 |
| Comparison 2 | 100 | 170 + 30 | 170 + 30 | 22 |
| 6 | 75 | 300 | 85 + 15 | 16 |
| 7 | 50 | 300 | 85 + 15 | 16.5 |
| 8 | 25 | 300 | 85 + 15 | 17.5 |
| Comparison 3 | 100 | 300 | 85 + 15 | 16 |
| 9 | 50 | 300 | 170 + 30 | 17.5 |
| Comparison 4 | 100 | 300 | 170 + 30 | 15.5 |
| Comparison 5 | — | — | 170 + 30 | 17.5 |

The above results show the unexpected effect of partial homogenization of the starting material before concentration and the effect of the total homogenization pressure for the same treated flux (Examples 2, 3 and 4) on the stabilization of evaporated milk by comparison with total homogenization (Comparison Examples 1, 2, 3 and 4).

In addition, the results obtained by partial homogenization of the starting material are comparable with those obtained by addition of a stabilizer, but without homogenization of the starting material before concentration (Examples 1–5, 6–8 and 9 compared with Comparison Example 5).

EXAMPLES 10–15

These Examples document the relationship which exists between the viscosity of the evaporated milk after sterilization and the quantity of stabilizing salt ($Na_2HPO_4$) added in the process according to the invention, on the one hand, and in a conventional process, on the other hand (Comparison Example 6).

The results relating to the viscosity of the evaporated milk as a function of the parameters of the process are set out in Table II below:

TABLE II

| Example | Homogenized flux (%) | Homogenization pressure of the starting material in one or two stages (bar) | $Na_2HPO_4$ added (%) | Viscosity (N.s.) |
|---|---|---|---|---|
| 10 | 50 | 250 + 50 | 0.06 | 15.5 |
| 11 | 25 | 250 + 50 | 0.1 | 16.5 |
| 12 | 25 | 170 + 30 | 0.12 | 16.5 |
| 13 | 50 | 300 | 0.06 | 16 |
| 14 | 75 | 300 | 0.08 | 15 |
| 15 | 50 | 250 + 50 + 5 mins. holding time at 80° C. | 0.02 | 15 |
| Comparison 6 | — | — | 0.12 | 17 |

The results set out in Table II above show that the partial homogenization of the starting material enables the quantity of stabilizing salt added to be considerably reduced for a comparable viscosity of the product after sterilization. The viscosity conditions in these Examples and for the conventional process are the minimum viscosity conditions corresponding to the highest stabilization possible by the addition of stabilizing salt because the viscosity decreases, passes through a minimum and then increases again when the quantity of stabilizing salt is increased.

More particularly, it has been found that the higher the percentage of homogenized flux, the smaller the quantity of stabilizing salt which should be added to reach the corresponding minimum viscosity.

EXAMPLE 16

The procedure is as in Example 1 except for sterilization. For sterilization, the concentrate is preheated to 80° C. in a plate-type heat exchanger, subsequently sterilized at 120° C. in a plate-type heat exchanger and then held for 7 minutes at that temperature in a holding tube. The concentrate is then expanded in a vessel where its temperature falls to 78° C. and is then homogenized in two stages at 200 bar and then 50 bar, after which the homogenizate is cooled to 20° C. in a plate-type heat exchanger and packed in cans which are hermetically sealed. Expansion, homogenization, cooling and packing are carried out under aseptic conditions. The product has the same stability in storage at ambient temperature as an evaporated milk stabilized with phosphate salts.

EXAMPLE 17

The procedure is as in Example 1 except for sterilization. For sterilization, the concentrate is preheated to 75° C. in a plate-type heat exchanger, subsequently sterilized at 140° C. by direct injection of steam and held at that temperature for 10 s in a tube (ultra-high temperature sterilization). After cooling to 73° C. in a plate-type heat exchanger, it is homogenized in two stages at 250 bar and then 50 bar, after which the homogenizate is cooled to 20° C. in a plate-type heat exchanger and packed in cartons which are hermetically sealed. All the steps after sterilization are carried out under aseptic conditions. The product has the same stability in storage at ambient temperature as an evaporated milk stabilized with phosphate salts.

For comparison, an evaporated milk treated in the same way, but without the steps of partial homogenization of the starting material, heat treatment of the homogenizate before concentration, heat treatment and homogenization of the concentrate described in detail in Example 1, would gel rapidly after an ultra-high temperature sterilization treatment.

In the foregoing description, evaporated milk was stabilized by partial homogenization of cow's milk before concentration. Analogous results would be obtained by corresponding treatment of milk from other mammals, for example cow-buffalo's milk, goat's milk or ewe's milk, without departing from the scope of the invention.

I claim:

1. A process for preparing an evaporated milk comprising separating a milk standardized to have a ratio by weight of fats to non-fat dry matter of from 0.2:1 to 1.2:1 into a first milk flux and a second milk flux, homogenizing the first flux under a pressure of from 150 bar to 500 bar to obtain a homogenized flux, mixing the homogenized flux and the unhomogenized second flux to obtain a flux mixture, heat-treating the flux mixture to stabilize bonds between proteins to obtain a heat-treated product, evaporatively concentrating the heat-treated product to obtain a concentrated product having a dry matter content of from 20% to 40% by weight, homogenizing the concentrated product to obtain a homogenized concentrated product and then sterilizing the homogenized concentrated product to obtain a sterilized product.

2. A process according to claim 1 wherein the flux mixture is heat-treated at a temperature of from about 80° C. to 150° C. for from about 1 s to 1200 s.

3. A process according to claim 1 wherein the milk is separated so that the first flux is in an amount of from 25% to 75% by weight of an amount of the first and second fluxes.

4. A process according to claim 1 or 2 further comprising, prior to separating the milk, heating the milk to a temperature of from 50° C. to 150° C. to obtain a heated milk, feeding the heated milk to a homogenizer so that a part of the heated milk by-passes the homogenizer to provide the second flux and so a part is introduced into the homogenizer to provide the first flux which is homogenized.

5. A process according to claim 1 or 2 further comprising, prior to sterilization, heat-treating the concentrated homogenized product to stabilize bound proteins to obtain a protein stabilized product.

6. A process according to claim 5 wherein the homogenized concentrated product is heat-treated at a temperature of from 50° C. to 150° C. for from 1 s to 600 s.

7. A process according to claim 5 further comprising, after heat treating and prior to sterilization, homogenizing the protein stabilized product.

8. A process according to claim 6 further comprising, after heat treating and prior to sterilization, homogenizing the protein stabilized product.

9. A process according to claim 4 further comprising, after heat treating and prior to sterilization, heat-treating the homogenized concentrated product to stabilize bound proteins to obtain a protein stabilized product and homogenizing the protein stabilized product.

10. A process according to claim 1 further comprising packing the homogenized product in a container, hermetically sealing the packed container and then sterilizing the packed homogenized product in the container.

11. A process according to claim 1 further comprising aseptically packing the sterilized product.

12. A process according to claim 1 wherein the homogenized product is subjected to in-line sterilization to obtain the sterilized product and further comprising homogenizing the sterilized product under aseptic conditions, cooling the homogenized sterilized product under aseptic conditions and then aseptically packing the cooled product.

13. A process according to claim 12 wherein the homogenized product is subjected to high-temperature-short-time sterilization.

14. A process according to claim 12 wherein the homogenized product is subjected to ultra-high-temperature sterilization.

* * * * *

UNITED STATES PATENT AND TRADEMARK OFFICE
CERTIFICATE OF CORRECTION

PATENT NO. : 5,229,159

DATED : July 20, 1993

INVENTOR(S) : Michael SCHWAN

It is certified that error appears in the above-identified patent and that said Letters Patent is hereby corrected as shown below:

Column 7, lines 25-26, change "concentrated homogenized" to --homogenized concentrated--.

Signed and Sealed this

Fifteenth Day of February, 1994

Attest:

BRUCE LEHMAN

Attesting Officer — Commissioner of Patents and Trademarks